United States Patent
Sayyed et al.

(10) Patent No.: US 11,900,128 B2
(45) Date of Patent: Feb. 13, 2024

(54) MODULARIZED BASIC INPUT OUTPUT SYSTEM (BIOS) FIRMWARE ACTIVATION

(71) Applicant: Dell Products L.P., Round Rock, TX (US)

(72) Inventors: Ibrahim Sayyed, Georgetown, TX (US); Sumanth Vidyadhara, Bangalore (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 17/449,319

(22) Filed: Sep. 29, 2021

(65) Prior Publication Data
US 2023/0100899 A1 Mar. 30, 2023

(51) Int. Cl.
*G06F 9/4401* (2018.01)
*G06F 11/30* (2006.01)
*G06F 9/54* (2006.01)
*G06F 9/24* (2006.01)
*G06F 8/65* (2018.01)
*G06F 9/445* (2018.01)

(52) U.S. Cl.
CPC .......... *G06F 9/4411* (2013.01); *G06F 9/4406* (2013.01); *G06F 9/542* (2013.01); *G06F 11/3075* (2013.01); *G06F 8/65* (2013.01); *G06F 9/24* (2013.01); *G06F 9/4401* (2013.01); *G06F 9/4403* (2013.01); *G06F 9/44505* (2013.01)

(58) Field of Classification Search
CPC .. G06F 9/4401; G06F 9/4411; G06F 9/44505; G06F 8/65; G06F 9/4403; G06F 9/24; G06F 9/4406; G06F 9/542; G06F 11/3075
USPC .................................................. 713/1, 2, 100
See application file for complete search history.

(56) References Cited

U.S. PATENT DOCUMENTS

| | | | | |
|---|---|---|---|---|
| 6,633,976 B1 * | 10/2003 | Stevens | ................. | G06F 9/4401 713/2 |
| 6,961,791 B2 * | 11/2005 | Cepulis | ................. | G06F 9/4411 710/10 |
| 8,898,797 B2 * | 11/2014 | Konetski | ................. | G06F 21/10 709/225 |
| 2004/0123019 A1 * | 6/2004 | Garney | ............... | G06F 12/0866 711/E12.019 |
| 2005/0108515 A1 * | 5/2005 | Rangarajan | ........... | G06F 9/4401 713/2 |
| 2013/0198505 A1 * | 8/2013 | Harmer | ................. | G06F 9/4401 713/2 |
| 2013/0311761 A1 * | 11/2013 | Dasari | ................... | G06F 9/4411 713/1 |
| 2020/0042327 A1 * | 2/2020 | Duncan | ................... | G06F 9/441 |

* cited by examiner

*Primary Examiner* — Ji H Bae
(74) *Attorney, Agent, or Firm* — Norton Rose Fulbright US LLP

(57) ABSTRACT

A basic input output system (BIOS) of an information handling system may access a first list indicating one or more activation statuses of one or more BIOS firmware modules. The BIOS may determine a BIOS firmware module of the one or more BIOS firmware modules to load based, at least in part, on the first list. The BIOS may load the determined BIOS firmware module during booting of the information handling system.

20 Claims, 8 Drawing Sheets

MODULARIZED BASIC INPUT OUTPUT SYSTEM (BIOS) FIRMWARE ACTIVATION

FIELD OF THE DISCLOSURE

The present disclosure generally relates to information handling systems, and more particularly relates to activation of modularized basic input output system (BIOS) firmware.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As information handling systems increase in complexity, so too do processes for initialization of information handling systems. For example, information handling systems may include increasing numbers of internal and external components, increasing a number of drivers and BIOS firmware feature sets to load and executed by BIOSs of information handling systems during booting of information handling systems. Drivers and firmware feature sets loaded and executed by BIOSs may be stored in system memory or, increasingly, as an amount of memory required to store BIOS drivers and firmware feature sets has increased, in extended system partitions on hard drives and/or solid state drives (SSDs) of information handling systems. The increasing number of drivers and BIOS firmware feature sets located, loaded, and executed by a BIOS during booting of an information handling system may lead to an increase in an amount of time required to initialize an information handling system, negatively impacting a user experience. Further, file paths pointing to storage locations of such drivers and firmware feature sets may be hard coded into a BIOS of an information handling system which may create security vulnerabilities in the information handling system.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may implement a BIOS firmware module manifest to allow flexible activation and deactivation of BIOS firmware modules, to allow flexible updating of BIOS firmware module file paths, and to enhance security of BIOS firmware module loading and execution. For example, the BIOS firmware module manifest may allow for modularization of BIOS firmware execution, enabling users to flexibly activate and deactivate BIOS firmware modules. Flexible activation of BIOS firmware modules may reduce boot time by allowing an information handling system to bypass loading and/or execution of BIOS firmware modules that are not activated by a user. Furthermore, use of a BIOS firmware module manifest can allow use of signatures associated with firmware module file paths stored in the manifest to verify the file paths and/or files, enhancing security of an information handling system by inhibiting denial of service and other attacks that may attempt to alter file paths. Use of a BIOS firmware module manifest may further allow flexible in band and out of band updating of BIOS firmware module file paths, allowing ease of installation and storage of first and third party BIOS firmware modules in a system memory or in an extended system partition and addition of BIOS firmware module file paths to the BIOS firmware module manifest and ease of alteration of file paths by authorized parties. Thus, modularized BIOS firmware activation and use of a BIOS firmware module manifest may enhance a user experience.

An information handling system may load BIOS firmware modules based on a list, such as a BIOS firmware module manifest, indicating activation status of one or more BIOS firmware modules. A method for activation of BIOS firmware module modules of an information handling system may include accessing, by a BIOS of the information handling system, a first list indicating activation status of one or more BIOS firmware modules. The first list may, for example, be a BIOS firmware module manifest, and may include BIOS firmware module identifiers for each of the one or more BIOS firmware modules, activation statuses of each of the one or more BIOS firmware modules, file paths indicating storage locations of each of the one or more BIOS firmware modules, and signatures for each of the file paths. BIOS firmware modules may, for example, include in band and out of band BIOS executable feature sets.

The BIOS of the information handling system may determine a BIOS firmware module of the one or more BIOS firmware modules to load based, at least in part, on the first list indicating activation status of the one or more BIOS firmware modules. For example, the BIOS of the information handling system may determine based on the list that a BIOS firmware module is marked as activated.

The BIOS of the information handling system may then load the determined BIOS firmware module during booting of the information handling system. Loading the determined BIOS firmware module may include determining based, at least in part, on the first list a file path of the determined BIOS firmware module. For example, the file path of the determined BIOS firmware module may indicate a location at which the BIOS firmware module is stored in a memory of the information handling system. In some embodiments the BIOS firmware module may be stored in an extended system partition of a hard drive or solid state drive of the information handling system or in a memory of a BIOS of the information handling system, such as a serial peripheral interface flash memory. The BIOS may then load the determined BIOS firmware module using the determined file path. In some embodiments, determining the file path of the determined BIOS firmware module may include authenticating a signature associated with the file path of the determined BIOS firmware module.

In some embodiments, a user may toggle an activation status of one or more BIOS firmware modules to control the BIOS firmware modules loaded by the BIOS upon a next reboot of the information handling system. For example, an operating system may receive, at operating system runtime, user input indicating activation of one or more BIOS firmware modules of the information handling system. For example, a user may select one or more BIOS firmware modules for activation via a graphical user interface or other interface of the information handling system. The operating system may notify the BIOS of the receipt of the user input indicating activation of the BIOS firmware module. For example, the OS may provide the notification to the BIOS via a windows management interface (WMI). In some embodiments, the OS may use the WMI to edit a file, accessible by the BIOS, indicating an activation status of the BIOS firmware module and may adjust the activation status of the BIOS firmware module based on the user input. In some embodiments, the OS may communicate with a service executed by the BIOS via the WMI to notify the service of the update to the activation status. The file edited by the OS may be the BIOS firmware module manifest, or another file including information about activation of BIOS firmware modules. The BIOS may then adjust an activation status of the BIOS firmware module in the list based, at least in part, on the notification. For example, the BIOS may read the file edited by the OS via the WMI and may determine an activation status of the BIOS firmware module to include in the BIOS firmware module manifest file based on the file edited by the OS via the WMI. The file edited by the OS via the WMI may, for example, be a platform extended feature set policy.

In some embodiments, the BIOS of the information handling system may also execute the BIOS firmware module when it is loaded. As one example, the BIOS firmware module may be a telemetry collection BIOS firmware module for collecting telemetry data devices and/or BIOS firmware modules while the information handling system is booting. In some embodiments, the BIOS firmware module may communicate with the operating system of the information handling system, such as using an advanced configuration and power interface (ACPI) table to provide telemetry data to the operating system when booting of the information handling system is complete. In some embodiments, a third-party service may collect the telemetry data gathered by the BIOS firmware module.

In some embodiments, the BIOS of the information handling system may generate the first list, such as the BIOS firmware module manifest. The first list may, for example, be generated during a power-on self-test (POST) stage of initialization of the BIOS. The BIOS may generate the list by populating the list with a plurality of BIOS firmware module identifiers identifying BIOS firmware modules of the information handling system, file paths associated with the BIOS firmware modules identified by the BIOS firmware module identifiers, signatures associated with the file paths and/or BIOS firmware modules, and activation statuses of the BIOS firmware modules. In some embodiments, the BIOS may include only activated BIOS firmware modules, associated file paths, and associated signatures in the first list. Generation of the first list may comprise including, in the first list, one or more signatures associated with the one or more file paths of the one or more BIOS firmware modules.

In some embodiments, the first list may be updated based on a received BIOS update. For example, an update to the BIOS of the information handling system may be received. The update may be applied to the BIOS of the information handling system, and application of the update may include updating the one or more file paths of the one or more BIOS firmware modules in the first list. For example, one or more file paths stored in the first list may be changed, and/or one or more file paths may be added to or removed from the first list.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, determine, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
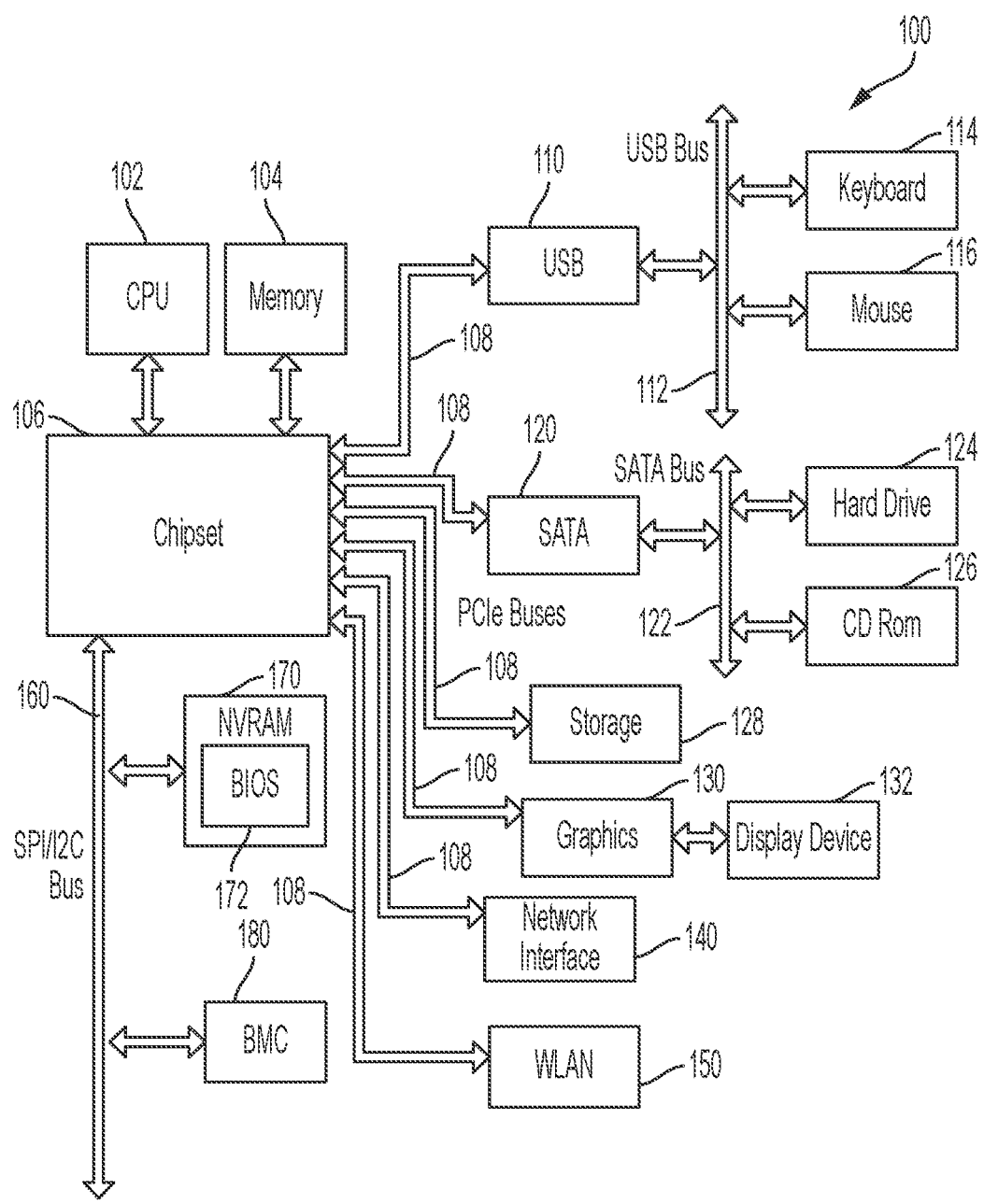
FIG. 1 is a block diagram of an example information handling system according to some embodiments of the disclosure.

FIG. 1 illustrates an example information handling system 100. Information handling system 100 may include a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In one example embodiment, chipset 106 may be directly connected to an individual end point via a PCIe root port within the chipset and a point-to-point topology as shown in FIG. 1. BMC 180 may be referred to as a service processor or embedded controller (EC). Capabilities and functions provided by BMC 180 may vary considerably based on the type of information handling system. For example, the term baseboard management system may be used to describe an embedded processor included at a server, while an embedded controller may be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system may be referred to as a storage enclosure processor or a chassis processor.

System 100 may include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 may include instructions executable by CPU 102 to initialize and test the hardware components of system 100, and to load a boot loader or an operating system (OS) from a mass storage device. BIOS 172 additionally may provide an abstraction layer for the hardware, such as a consistent way for application programs and operating systems to interact with the keyboard, display, and other input/output devices. When power is first applied to information handling system 100, the system may begin a sequence of initialization procedures, such as a BIOS boot procedure. During the initialization sequence, also referred to as a boot sequence, components of system 100 may be configured and enabled for operation, and device drivers may be installed. Device drivers may provide an interface through which other components of the system 100 can communicate with a corresponding device. BIOS, as used herein, may also refer to a unified extensible firmware interface (UEFI).

In some embodiments, one or more BIOS firmware modules to be loaded and executed by the BIOS 172 during booting of the information handling system may be stored in a memory 170 of the BIOS 172. One or more BIOS firmware modules to be loaded and executed by the BIOS 172 during booting of the information handling system 100 may also be stored in system storage 128, such as in a hard drive of the information handling system or in a solid-state drive of the information handling system. In some embodiments, such BIOS firmware modules may be stored in hard drive 124. For example, available space in the BIOS memory 170, such as in a serial peripheral interface flash memory, may be limited. To allow for a more extensive array of BIOS firmware modules to be loaded and executed by the BIOS 172, BIOS firmware modules, such as BIOS feature sets, BIOS recovery files, drivers or driver components, telemetry data, and other BIOS firmware modules, along with a host operating system, recovery operating system boot sensitive files, may be stored in an extended system partition of a hard drive or solid state drive of the information handling system accessible to the BIOS 172. File paths to the information stored in an extended system partition on a hard drive or solid-state drive of the information handling system may be hard coded into the BIOS 172 of the information handling system 100. BIOS firmware modules may, for example, include BIOS drivers and other BIOS firmware components. In some embodiments, BIOS firmware modules may include third party firmware modules, such as third-party drivers, that may be hosted and run by a BIOS, such as to collect telemetry from one or more devices, such as components of the information handling system, during booting of the information handling system.

Information handling system 100 may include additional components and additional busses, not shown for clarity. For example, system 100 may include multiple processor cores, audio devices, and the like. While a particular arrangement of bus technologies and interconnections is illustrated for the purpose of example, one of skill will appreciate that the techniques disclosed herein are applicable to other system architectures. System 100 may include multiple CPUs and redundant bus controllers. One or more components may be integrated together. For example, portions of chipset 106 can be integrated within CPU 102. Additional components of information handling system 100 may include one or more storage devices that may store machine-executable code, one or more communications ports for communicating with external devices, and various input and output (I/O) devices, such as a keyboard, a mouse, and a video display.

When power is supplied to the information handling system 100, or when the information handling system 100 is rebooted, BIOS 172 may perform a boot sequence to initialize hardware and firmware components of the information handling system and load an operating system of the information handling system. During the boot sequence, the BIOS may load one or more drivers which may initialize and operate components of the information handling system, such as hardware components, and/or gather telemetry data regarding the components during initialization of the information handling system.

When power is applied to an information handling system, a BIOS may proceed through a series of stages 200 to boot an information handling system. The series of stages 200 may be referred to as a boot or initialization procedure. An information handling system may be powered on at stage 202. For example, power may be cycled during rebooting of an information handling system or power may be applied to an information handling system that was previously shut down. When the BIOS receives power, it may begin a booting process to initialize the information handling system. After a BIOS is powered on, the BIOS may enter a pre-extensible firmware interface (EFI) stage 204 of initialization of the information handling system. During the pre-EFI stage 204 the BIOS may initialize a CPU, a chipset, and/or a motherboard of the information handling system. After the BIOS has completed the pre-EFI stage 204, the BIOS may proceed to the driver execution environment (DXE) stage 206 of the booting process. At the DXE stage 206, the BIOS may load and execute one or more drivers for one or more components of the information handling system, such as drivers for hardware components including memories, ports, graphics cards, and other information handling system components. After the DXE stage 206 is complete, the BIOS may enter the boot device select (BDS) stage 208, where the BIOS may select a device from which to boot an operating system of the information handling system. Following the BDS stage 208, the BIOS may enter a ready to boot (RB) stage 210 of booting the information handling system, where the BIOS may begin loading an operating system of the information handling system. When the BIOS completes loading of the operating system of the information handling system, the BIOS may enter an exit boot (EB) stage 212. Once booting is exited, the information handling system may enter host operating system runtime at stage 214.

During the boot stages 204-212, the BIOS may load and execute BIOS firmware modules, which may include BIOS feature sets and/or BIOS drivers, that may add additional functionality to the BIOS during booting of the information handling system. For example, BIOS firmware modules may include BIOS feature sets, BIOS drivers, and other BIOS firmware modules. For example, firmware modules may include feature sets developed by third parties, such as BIOS firmware modules for collecting telemetry data during booting of the information handling system. In some embodiments, BIOS firmware modules may be associated with specific stages of booting of the information handling system, such as a DXE stage 206 or a BDS stage 208.

Figure 3:
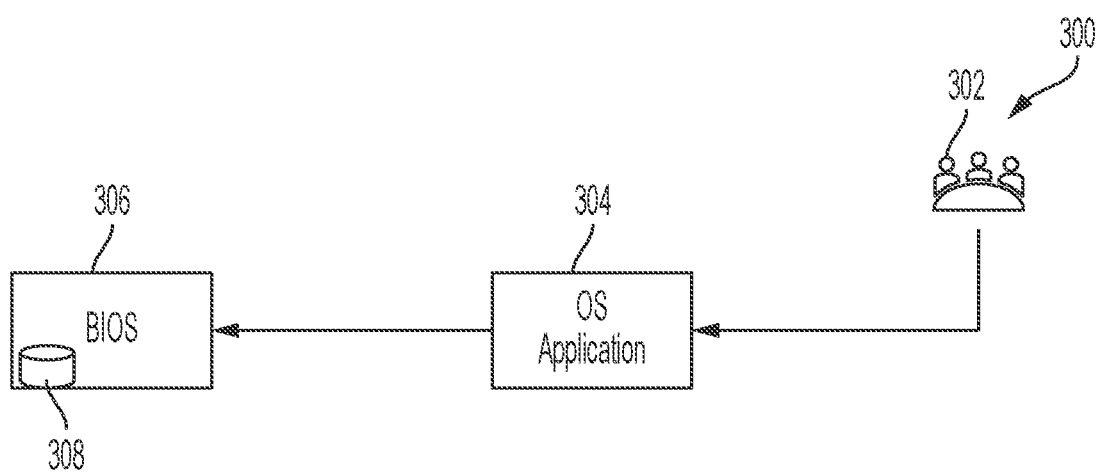
FIG. 3 is a block diagram of example interaction between a BIOS and an OS application according to some embodiments of the disclosure.

An increasing number of BIOS firmware modules, from first and third parties, that may be stored in a BIOS memory or in an extended system partition on another memory of an information handling system may increase a time required for booting an information handling system, negatively impacting a user experience. Thus, BIOS firmware may be modularized into BIOS firmware modules, allowing users of information handling systems to elect whether to activate or deactivate specific BIOS feature sets/firmware modules. Selection of BIOS firmware modules for activation/deactivation may reduce a time required for booting an information handling system by allowing a BIOS to load and execute BIOS firmware modules that are selected for activation while bypassing loading and execution of BIOS firmware modules that are not selected for activation. An example system 300 for selection of BIOS firmware modules for activation is shown in FIG. 3. A user 302 may interact with an application 304 of an information handling system at operating system runtime to select one or more BIOS firmware modules for activation. For example, a default state of BIOS firmware modules may be deactivated, while a user may be required to enroll/select BIOS firmware modules for activation. In some embodiments, a third party may transmit information to the operating system application 304 for activation of firmware modules. For example, an information technology (IT) administrator may enroll a client information handling system in a particular BIOS feature set, or a customer may purchase access to a BIOS feature set from a third party. In some embodiments, the application 304 may display a list of available BIOS firmware modules to a user and allow a user to select firmware modules for activation. When the application 304 receives user input selecting one or more firmware modules for activation, the application 304 may communicate with a BIOS 306 of the information handling system to notify the BIOS 306 of activation/deactivation of BIOS firmware modules. In some embodiments, the application 304 may communicate with the BIOS 306 via a windows management interface (WMI) to activate the selected BIOS firmware modules. For example, the application 304 may interact with the BIOS 306 to locate and update a list of BIOS firmware modules and associated activation statuses stored in a memory 308 of the BIOS 306, such as a BIOS firmware module policy information set and/or a BIOS firmware module manifest. In some embodiments, the application 304 may communicate with a service executed by the BIOS to update a firmware module policy information set and/or a BIOS firmware module manifest.

Figure 4:
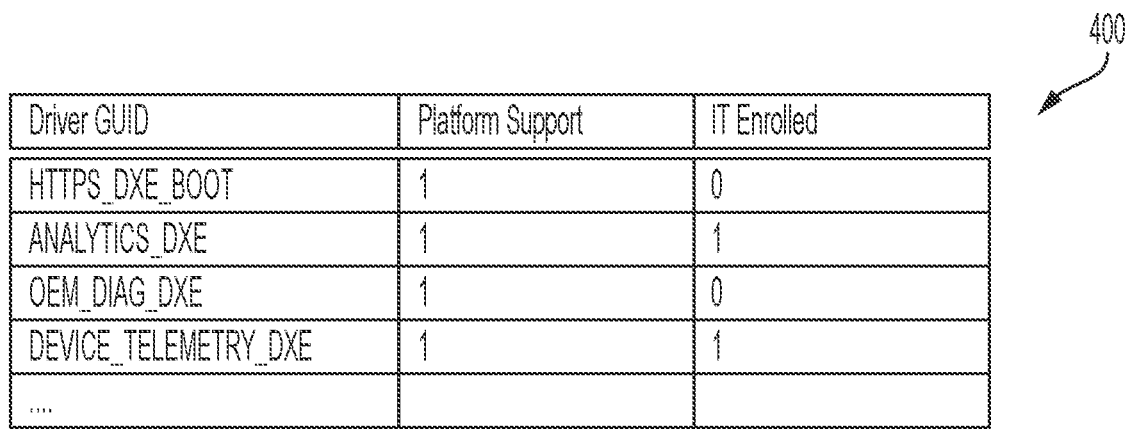
FIG. 4 is an example diagram of an example list of BIOS firmware modules and activation statuses according to some embodiments of the disclosure.

An example BIOS firmware module policy set 400 is shown in FIG. 4. The BIOS firmware module policy set 400 may include a plurality of identifiers of BIOS firmware modules, such as identifiers of a plurality of BIOS drivers, along with indicators of whether the BIOS firmware modules are supported by the information handling system and whether the firmware modules have been activated, such as whether an IT administrator of the information handling system has activated the firmware modules. Such firmware modules may, for example, include a hypertext transfer protocol secure (HTTPS) DXE boot firmware module, a DXE analytics firmware module, an original equipment manufacturer (OEM) diagnostics DXE firmware module, a DXE device telemetry firmware module, and other BIOS firmware modules. In some embodiments, the firmware module policy set 400 may be stored in a memory of the BIOS, while in other embodiments, the firmware module policy set 400 may be stored in another memory of the information handling system, such as in an extended system partition of a hard drive or solid-state drive of the information handling system. Thus, a user may select one or more firmware modules for activation and a BIOS, when booting the information handling system, may load only BIOS firmware modules that have been activated based, at least in part, on the firmware module policy set 400. In some embodiments, the BIOS firmware module policy set 400 may be included in a BIOS firmware module manifest of the information handling system, which may also include one or more file paths for accessing the BIOS firmware modules. In some embodiments, the BIOS firmware module policy set 400 may be referred to as a BIOS extended feature set policy.

Figure 5:
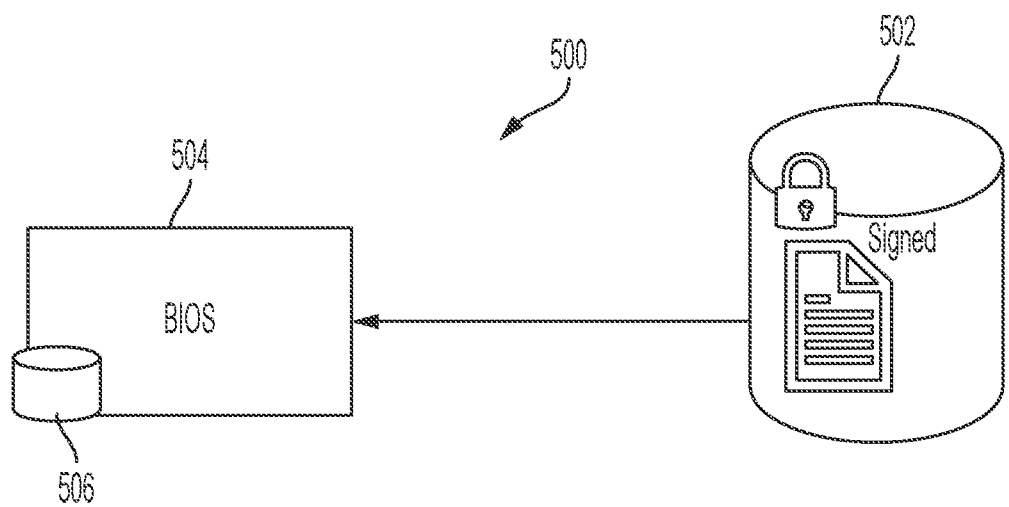
FIG. 5 is a block diagram of a signature verification system for a BIOS according to some embodiments of the disclosure.

During initialization of the information handling system, the BIOS may load a list of BIOS firmware module activation statuses, such as a BIOS extended feature set policy and/or a BIOS firmware module manifest, to determine which BIOS firmware modules should be loaded during booting of the information handling system. In some embodiments, such a list may include logical device paths for each of the BIOS firmware modules and may be stored on an extended system partition of a hard drive or solid-state drive of the information handling system. Such a list may be populated on the extended system partition with addresses and activation statuses as part of a BIOS update. Early during booting of the information handling system, the BIOS may locate and load the list, such as the BIOS extended feature set policy and/or the BIOS firmware module manifest. The BIOS may determine firmware modules that are activated based on the list and may locate the firmware modules in the extended system partition based on file addresses and/or device paths included in the list. The BIOS may verify authenticity and security of the firmware modules when they are located. An example system 500 for verifying authenticity of a firmware module and/or a BIOS firmware module manifest is shown in FIG. 5. A platform key 502 may be used by the BIOS 504 to verify the authenticity of the firmware modules when they are located. In some embodiments, the platform key 502 may be stored in a memory 506 of the BIOS 504. In some embodiments, the BIOS 504 may also verify a signature of the list, such as the BIOS extended feature set policy and/or BIOS firmware module manifest, using the platform key 502 or another key. For example, a signature of the BIOS firmware module manifest file may be verified using a public key and a private key, such as by verifying a signature of the BIOS firmware module manifest file using a platform key. In some embodiments, the key may be a secure hash algorithm 256 (SHA256) key. In some embodiments platform keys for each file path for each firmware update stored in a BIOS firmware module manifest After the list has been verified/authenticated, the BIOS may proceed to begin a discovery process to determine a logical extension of each device path of the firmware modules that are activated. In some embodiments, the BIOS firmware module manifest file and/or the BIOS extended feature set policy may be stored in a memory 506 of the BIOS.

Figure 2:
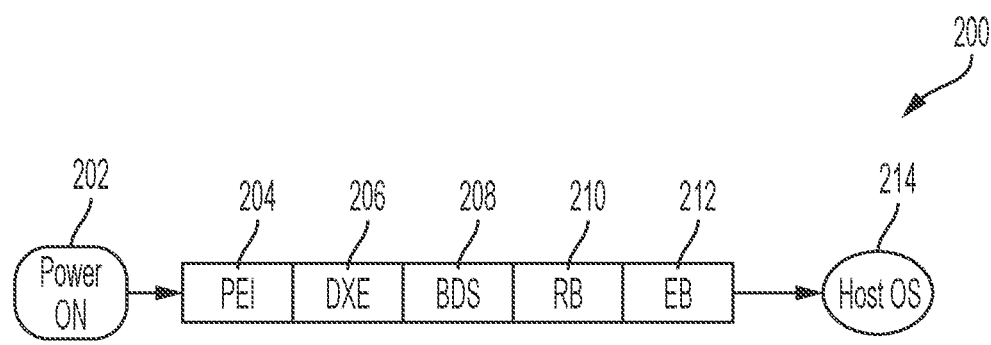
FIG. 2 is an example diagram of a BIOS booting process according to some embodiments of the disclosure.
Figure 6:
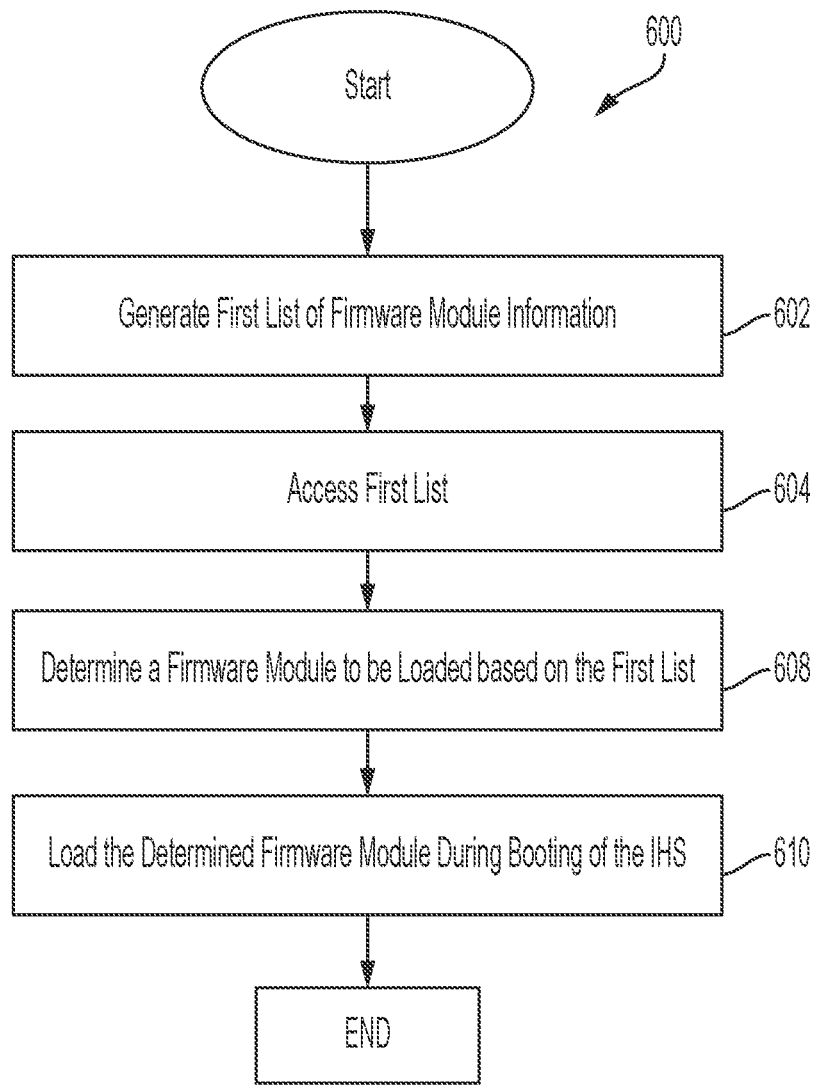
FIG. 6 is a flow chart diagram of an example method of loading BIOS firmware modules based on an activation status of the BIOS firmware modules according to some embodiments of the disclosure.

An example method 600 for loading of modularized activated BIOS drivers is shown in FIG. 6. The method 600 may, for example, be performed by a BIOS of an information handling system. The method 600 may begin, at step 602, with generation of a first list of firmware module information. The first list of firmware module information may, for example, comprise a BIOS firmware module manifest file and/or a BIOS extended feature set policy. The first list may include a list of BIOS firmware modules and accompanying status indicators indicating whether each firmware module is activated or deactivated. The list may further include system addresses and/or file paths indicating locations of each of the firmware modules, such as locations on an extended system partition of a hard drive and/or a solid-state drive of the information handling system at which the firmware modules are stored. In some embodiments, the list may also include one or more signatures for authentication of the list. Generating the list may include receiving, by the BIOS, one or more firmware module addresses in a BIOS update and/or receiving one or more indications of activation statuses of the firmware modules from an application of the information handling system at OS runtime. For example, early in a booting process, such as during packaging of the BIOS and before power-on self-test (POST), a list, such as a BIOS driver manifest file, may be populated. Population of the list may include adding one or more BIOS firmware module indicators, one or more file paths for the one or more BIOS firmware modules indicators, one or more activation statuses for the one or more BIOS firmware modules, and one or more booting stages associated with each BIOS firmware module to the list. In some embodiments, BIOS firmware module activation statuses may be retrieved from a BIOS extended feature set policy. The file paths for the BIOS firmware modules may, for example, be bound with boot stages of the BIOS, such as DXE or RB. Such binding may allow the BIOS to determine the booting stage at which each activated BIOS firmware module should be loaded and executed. Generation of the list may also include generation of a list of in and out of band updates and an allowed/blocked extended image list, which may also be included in the first list. Generation of the first list may also include determination of a file size of each BIOS driver and inclusion of such a size for each listed driver. Thus, the file paths for the drivers may be updated and adjusted, rather than hard coded into the BIOS. In some embodiments, multiple lists of BIOS firmware modules may be generated each including drivers to be loaded during different stages of booting of the information handling system, such as the stages of FIG. 2. In some embodiments, a single list may be generated, and the single list may include indicators of BIOS booting stages for loading of the firmware updates. Generation of the first list may include adding secure hash algorithm 256 (SHA256) authentication to the file paths and/or addresses for the BIOS firmware modules, such as by adding SHA256 keys to each file path, to allow authentication and verification of the file paths and/or addresses.

At step 604, the first list indicating firmware module activation status may be accessed by the information handling system. For example, the first list may be stored in a memory of the BIOS and/or in an extended system partition of a hard drive or solid state drive of the information handling system. The BIOS, early in booting, such as during a PEI stage of booting, may access the first list to verify and/or authenticate the first list and to determine one or more drivers for loading. In some embodiments, a system process executed by the BIOS may locate and access the first list.

At step 608, a firmware module to be loaded may be determined based, at least in part, on the first list. For example, the BIOS may examine firmware module identifiers of the first list and their accompanying firmware module activation indicators to determine which firmware modules are activated. In some embodiments, the BIOS may examine firmware module identifiers that are indicated as being associated with a particular stage of booting that the BIOS is engaged in or preparing for to determine which firmware modules to load. If a firmware module is indicated as activated based on a firmware module identifier, the BIOS may determine to load the firmware module. At step 610, the determined firmware module may be loaded. For example, the BIOS may determine that a firmware module is associated with an activation indicator indicating that the firmware module is activated and may load the firmware module during booting of the information handling system. In some embodiments, loading of the firmware module may be bound to boot and/or runtime services for enumeration and growth. The BIOS may locate the firmware module to be loaded based on a file path or address indicating a storage location of the BIOS firmware module. In some embodiments, the BIOS may authenticate a file path of the firmware module and/or the firmware module itself before loading the firmware module, using one or more keys.

Figure 7:
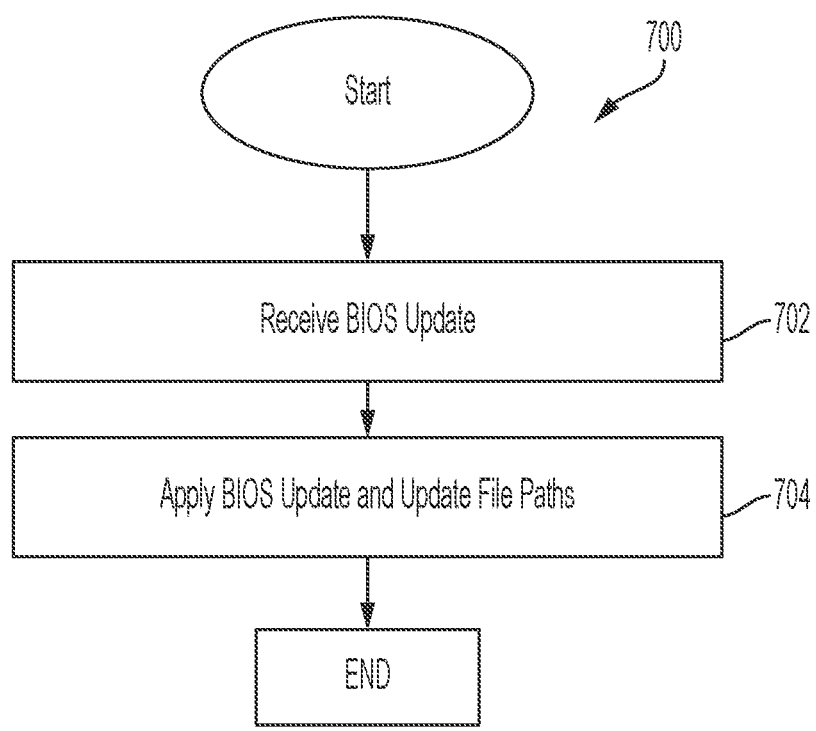
FIG. 7 is a flow chart diagram of an example method of updating file paths in a list of BIOS firmware module file paths based on a BIOS update according to some embodiments of the disclosure.

In some embodiments, file paths of a list of firmware modules, activation statuses, and file paths, such as a BIOS firmware module manifest file, may be adjustable, rather than hard coded into a BIOS of the information handling system. For example, when a new firmware module is downloaded, a file path or address of the firmware module may be added to the list without hardcoding the address of the firmware module into the BIOS of the information handling system. An example method 700 for updating one or more BIOS firmware module addresses in a list, such as a BIOS firmware module manifest file, is shown in FIG. 7. At step 702, a BIOS update may be received. For example, an update to one or more files of a BIOS may be received from an external source, such as one or more BIOS firmware modules or updates to one or more BIOS firmware modules. At step 704, the BIOS update may be applied and one or more file paths of one or more BIOS driver modules may be updated. For example, a list, such as a BIOS firmware module manifest file stored in a BIOS memory or an extended system partition on a hard drive or solid-state drive of an information handling system, may be updated to add, remove, or alter one or more addresses or file paths of one or more BIOS firmware modules. Use of a list that may be easily updated, rather than hard coding of file paths for the firmware modules into the BIOS, may enhance the security of the information handling system, increasing a difficulty of reverse engineering locations of BIOS firmware modules from BIOS code and allowing authentication of addresses of BIOS firmware modules using authentication keys, such as SHA256 authentication keys stored in the first list.

Figure 8:
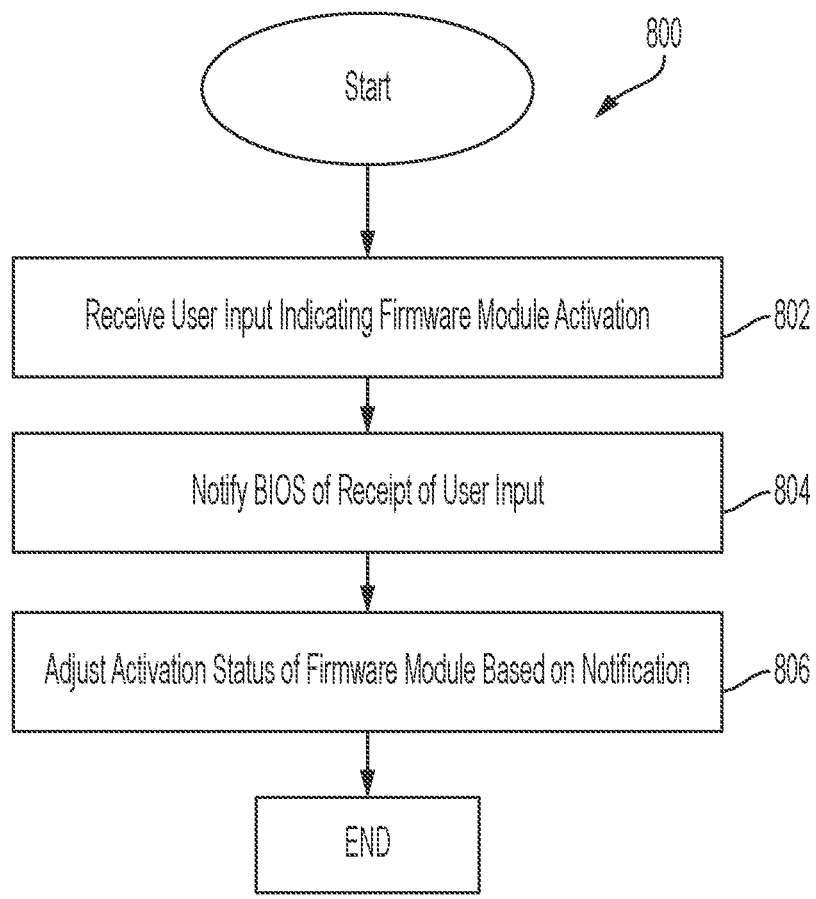
FIG. 8 is a block diagram of an example method for adjusting BIOS firmware module activation status based on user input according to some embodiments of the disclosure.

Use of a first list, such as a BIOS firmware module manifest file, to determine loading and execution of BIOS firmware modules may allow a user to select one or more firmware modules for activation. Thus, the BIOS may load and execute only firmware modules selected by a user for activation, reducing an amount of time that would be required for booting if the BIOS loaded and executed all available firmware modules. An example method 800 for selection of firmware modules for activation is shown in FIG. 8. The method 800 may begin, at step 802, with receipt of user input indicating firmware module activation. Receipt of user input may, in some embodiments, be performed by an operating system and/or application of the information handling system. For example, a user of an information handling system may be presented, by an application at operating system runtime, with a list of BIOS firmware modules supported by the information handling system. The user may select one or more firmware modules for activation. In some embodiments an IT administrator or vendor may activate firmware modules remotely, such as when a user purchases access to one or more BIOS feature sets included in one or more BIOS firmware modules.

At step 804, the BIOS may be notified of receipt of the user input indicating activation of one or more BIOS firmware modules. For example, the operating system of the information handling system or the application of the information handling system may inform the BIOS of the user input indicating activation of one or more firmware modules. In some embodiments, the operating system and/or the application may communicate with the BIOS via a windows management interface. In some embodiments, such communication with the BIOS may include communication with a service executed by the BIOS via windows management interface. Informing the BIOS of receipt of user input may include adjusting one or more activation status indicators for the one or more BIOS firmware modules in a BIOS firmware manifest file and/or a BIOS extended feature policy list stored in a BIOS memory or in an extended system partition of the information handling system.

At step 806, the BIOS may adjust activation status of the firmware module based on the received notification. For example, the BIOS may read the activation status of the firmware module from the BIOS firmware module manifest file and/or the BIOS extended feature policy list at a next boot and may load the firmware module based on the activation of the firmware module. In some embodiments, the BIOS may read the activation status of the firmware module from the BIOS extended feature policy list and may adjust an activation status of the firmware module in the BIOS firmware module manifest file based on the activation status of the firmware module in the BIOS extended feature policy list. In some embodiments, a service executed by the BIOS may receive, via windows management interface, a notification from the application of the receipt of the user input, and the BIOS service may update a BIOS firmware module manifest to reflect the received user input indicating an update to an activation status of a firmware module. For example, the BIOS service may update an activation status indicator in the BIOS firmware module manifest from deactivated to activated. Thus, an OS and/or application of an information handling system may communicate with a BIOS to allow a user to activate and deactivate BIOS firmware modules.

Figure 9:
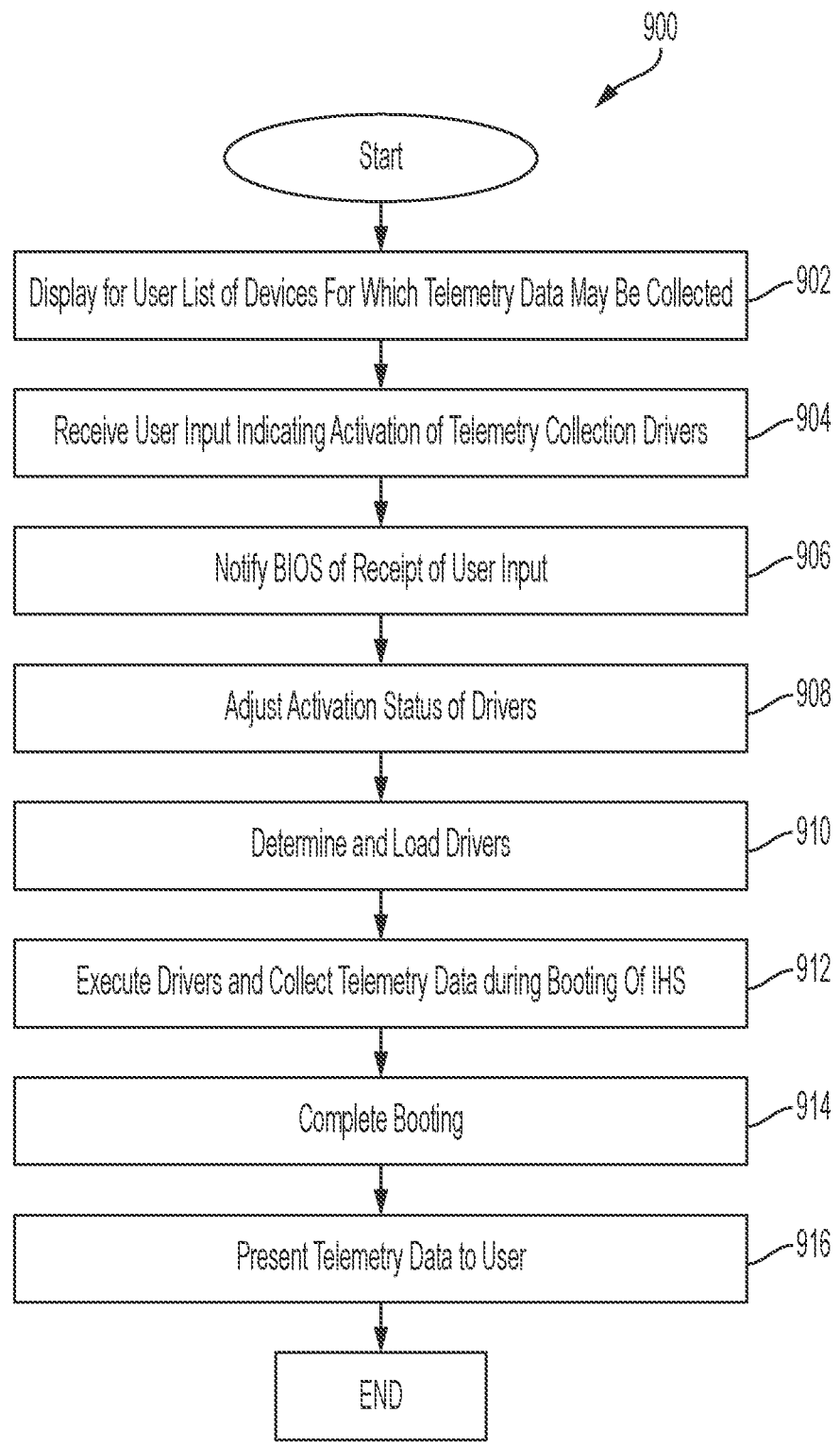
FIG. 9 is a block diagram of an example method for loading and execution of a BIOS firmware module based on an activation status of the BIOS firmware module according to some embodiments of the disclosure.

Some BIOS firmware modules may be used to collect telemetry data from information handling system components during booting of an information handling system. Such telemetry data may be used to detect bugs and/or inefficiencies in booting of the information handling system. An example method 900 for activation and execution of a BIOS firmware module for collection of telemetry data during booting of an information handling system is shown in FIG. 9. The method 900 may begin, at step 902, with display of a list of devices for which telemetry data may be collected. For example, a list of devices for which a BIOS platform supports collection of telemetry data, such as vendor specific telemetry data, may be displayed for a user at operating system runtime. Such display may be performed as part of a display for receiving user input indicating firmware module activation as described with respect to step 802 of FIG. 8. In some embodiments, a telemetry service executed by the BIOS may communicate with an operating system of the information handling system, such as with an application executed at operating system runtime, to provide the operating system with information for display of a list of devices for which telemetry data may be collected. Such a list may include a non-volatile memory, a Wi-Fi chipset, an audio chipset, a windows management interface namespace, and advanced configuration and power interface (ACPI) source language (ASL) methods for setting firmware activation statuses and/or policies. In some embodiments, the list may be provided to the application executed at operating system runtime by a BIOS service using an ACPI table.

At step 904, the information handling system may receive user input indicating activation of one or more telemetry collection drivers. For example, a user may indicate one or more devices for which the user desires the BIOS to collect telemetry data during a next boot of the information handling system. In some embodiments, the user may select one or more devices from the list displayed at step 902, and an application or service executed at operating system runtime of the information handling system may determine one or more telemetry collection drivers for activation based on the selected devices. As one example, a user may opt in for execution of one or more firmware modules for collection of telemetry data during booting when the information handling system has encountered problems or slowdowns. In some embodiments, an out of band telemetry service, such as a third-party telemetry service, may store firmware modules, such as BIOS firmware modules, in an extended system partition on a hard drive or solid state drive of the information handling system. For example, a telemetry service may store one or more telemetry driver images in an extended system partition of the information handling system for loading by the BIOS. In some embodiments, the telemetry service may download and/or store the BIOS firmware modules, such as telemetry collection drivers, based on the selection of the one or more devices for which telemetry data should be collected by the user. Firmware images for telemetry drivers may be stored in an extended system partition of the information handling system.

At step 906, the application or service of the information handling system may, at operating system runtime, notify a BIOS of the information handling system of the receipt of the user input. Such notification may be similar to the notification described with respect to step 804 of FIG. 8. For example, the application or service may notify the BIOS of the receipt of the user input via a windows management interface. As one example, an application or service may update a BIOS firmware module policy set and/or a BIOS firmware module manifest based on the received user input. In some embodiments, a telemetry service may be executed by the operating system and may add device file paths and/or addresses for the drivers stored on the extended system partition to a BIOS firmware module manifest for use by the BIOS in loading the one or more BIOS firmware modules, such as telemetry collection drivers. At step 908, an activation status of the telemetry collection drivers may be adjusted. For example, telemetry collection drivers may be or may be comprised in BIOS firmware modules, and a BIOS may adjust an activation status of the drivers as described with respect to step 806 of FIG. 8.

At step 910, the activated telemetry collection drivers may be determined and loaded. For example, at a next boot of the information handling system, following selection of one or more telemetry collection drivers by the user, the BIOS may determine one or more telemetry collection drivers that are activated and may load the drivers based, for example, on a list of activated BIOS firmware modules, such as a BIOS firmware module manifest and/or a BIOS firmware module policy set. In some embodiments, a service, such as a telemetry service, may be executed by the BIOS to locate the driver images on the extended system partition to be loaded upon a secure boot signature pass. For example, the service may be loaded and executed by the BIOS as part of the system boot flow early during booting of the information handling system for reading and verification of a BIOS firmware module manifest. Loading the telemetry collection drivers may also include authenticating the telemetry collection drivers, such as verifying signatures of the telemetry collection drivers.

At step 912, the BIOS may, after loading the telemetry collection drivers, execute the telemetry collection drivers. For example, the telemetry collection drivers may be executed by the BIOS and may collect telemetry data from one or more devices of the information handling system, such as a Bluetooth chipset, a Wi-Fi chipset, a memory, a hard drive, a solid-state drive, or another device of the information handling system, while the BIOS is booting the information handling system. The telemetry collection performed by the telemetry collection drivers may, for example, not be telemetry data collected to fill a unified extensible firmware interface (UEFI) platform data table that may be automatically filled during booting of an information handling system. In some embodiments, the drivers may activate vendor-created firmware that resides within hardware components of the information handling system for collection of telemetry data related to the components. Thus, use of BIOS firmware modules may enable vendors to collect telemetry data using their own proprietary runtime services following booting of the information handling system. In some embodiments, vendors may create their own UEFI DXE and runtime firmware image sets on a system partition that may be loaded upon a special boot scenario, such as a special boot scenario indicated by user input received at step 904.

At step 914, the BIOS may complete booting of the information handling system. For example, the BIOS may finish booting the information handling system and the information handling system may enter operating system runtime.

At step 916, telemetry data collected by the one or more telemetry collection drivers may be presented to a user of the information handling system. For example, once the BIOS has finished booting the information handling system, the telemetry collection driver may provide telemetry data collected during booting of the information handling system to a service or application executed by the information handling system. In some embodiments, a vendor service may gather telemetry data collected by one or more telemetry collection drivers during booting of the information handling system using vendor-specific ACPI tables. The collected telemetry data may be displayed for a user of the information handling system and/or may be transmitted to a third party. Thus, telemetry collection drivers are one example of BIOS firmware modules that may be activated and deactivated by a user and may be located using addresses and/or file paths including in a BIOS firmware module manifest.

Figure 10:
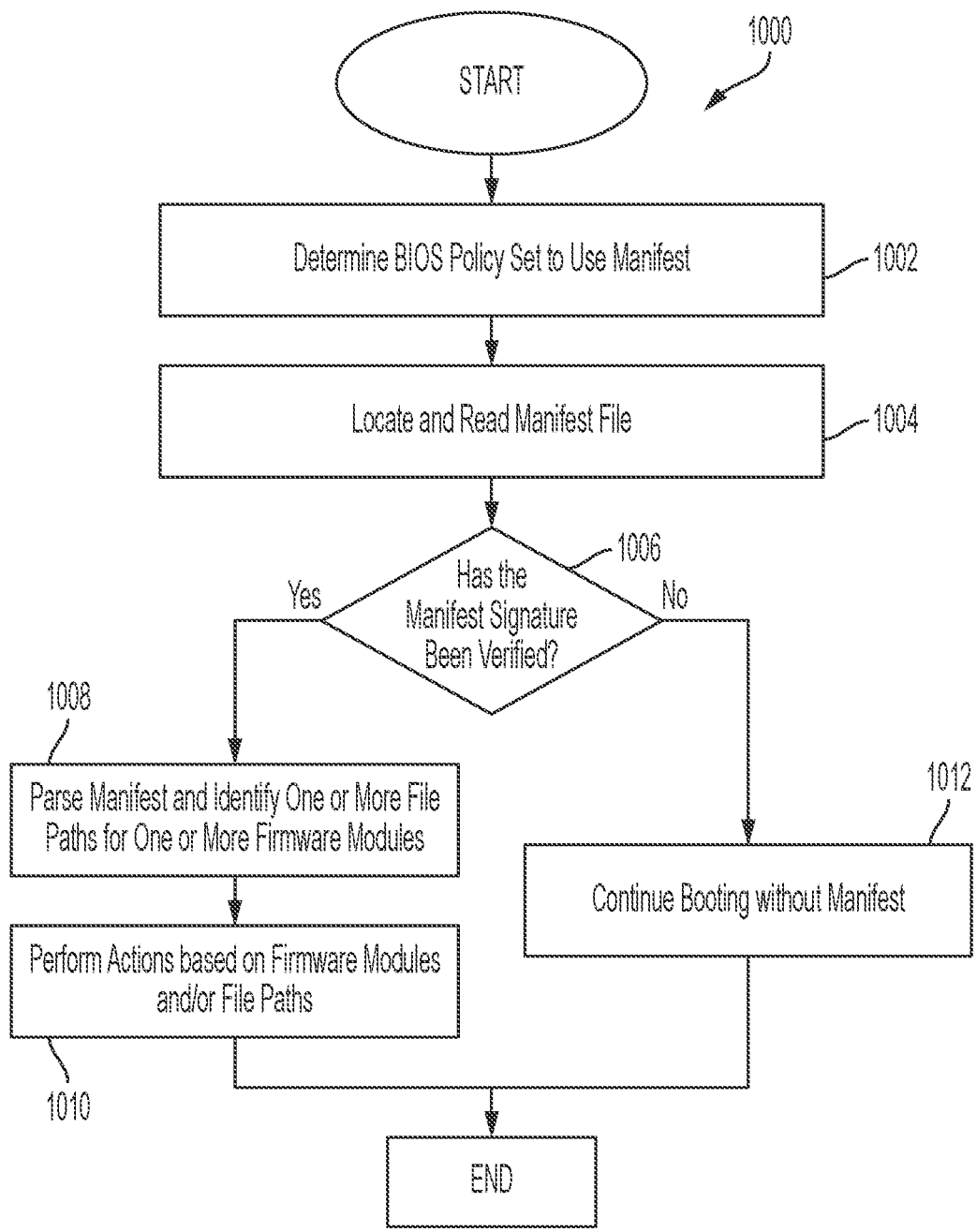
FIG. 10 is a block diagram of an example method for use of a BIOS firmware module manifest according to some embodiments of the disclosure.

During booting of an information handling system, a BIOS may utilize a BIOS firmware module manifest to determine one or more actions to perform during booting of the information handling system. An example method 1000 for use of a BIOS firmware module manifest by a BIOS is shown in FIG. 10. The method 1000 may, in some embodiments, be performed at multiple stages of booting of the information handling system, such as at a PEI stage, a DXE stage, a BDS stage, an RB stage, and other stages. The method 1000 may begin at step 1002 with determining that a BIOS policy is set to use a BIOS firmware module manifest. For example, the BIOS may read a variable and may determine that a policy for loading of BIOS firmware modules is set to perform such loading based on a BIOS firmware module manifest. If the policy is not set to use the firmware module manifest, the BIOS may proceed with booting of the information handling system without using the BIOS firmware module manifest. For example, the BIOS may proceed to load and execute all firmware modules stored on an extended system partition or no firmware modules stored on an extended system partition, regardless of an activation status of the BIOS firmware modules specified by the BIOS firmware module manifest. In some embodiments, the policy may be determined for each of multiple stages of booting of the information handling system. For example, when a BIOS enters a PEI stage of booting of an information handling system, the BIOS may perform a BIOS recovery flow operation and may determine that the policy is set to make use of the BIOS firmware module manifest before loading BIOS firmware modules associated with the PEI stage from an extended system partition. Likewise, during an RB phase of booting of the information handling system, the BIOS may perform a BIOS connect flow operation, an original equipment manufacturer flow operation, a BIOS update flow operation, a service operating system flow operation, a telemetry flow operation, and/or an e-diagnostics flow operation, each of which may trigger and/or include determining that the BIOS policy is set to make use of the BIOS firmware module manifest for loading of firmware modules associated with the RB phase of the booting operation. Such operations may, for example, be performed as part of a BIOS POST flow operation.

At step 1004, the BIOS may locate and read the BIOS firmware module manifest. For example, the BIOS may locate and read the BIOS firmware manifest based on the determination that the policy of the information handling system is set to use the BIOS firmware manifest policy. In some embodiments, the BIOS may locate and read the BIOS firmware manifest from a serial peripheral flash memory of the information handling system, such as a memory of the BIOS of the information handling system, or from an extended system partition located on a hard drive or solid-state drive of the information handling system. In some embodiments, the BIOS may execute a service to load and read the BIOS firmware manifest.

At step 1006, the BIOS may determine whether one or more signatures of the BIOS firmware module manifest file are verified. For example, the BIOS may attempt to verify a signature of the BIOS firmware module manifest file as described with respect to FIG. 5. In some embodiments, signatures for each of the firmware modules to be loaded may be read and verified from the BIOS firmware module manifest. For example, signatures for each of the firmware modules to be loaded in the specific stage of booting for which firmware modules are being loaded may be verified. The signature of the BIOS firmware module manifest may, for example, be a secure has algorithm 256 (SHA-256) signature. In some embodiments, the signatures for each of the firmware modules being loaded may be signatures associated with file paths for each of the firmware modules.

If the signature(s) of the BIOS firmware module manifest are verified at step 1006, the BIOS may, at step 1008, parse the manifest and identify one or more file paths for the one or more firmware modules. For example, the manifest may include file paths and or addresses indicating locations at which each of the firmware modules are stored. In some embodiments, the BIOS may read the manifest to determine locations of each of the firmware modules to be loaded during the stage of booting currently being performed. In some embodiments, such a determination may include a determination of which firmware modules are activated, such as by reading an activation status indicator for each of the BIOS firmware modules to determine which BIOS firmware modules should be loaded.

At step 1010, the BIOS may perform one or more actions based on the determined firmware modules to be loaded and the associated file paths and/or addresses for each of the firmware modules. Such actions may include, for example, loading and executing one or more of the firmware modules. In some embodiments, the BIOS may trigger an alarm and/or raise an alarm level of the information handling system, such as an inter-observer agreement alarm level, if the BIOS determines one or more security issues with the firmware modules being loaded and or executed, such as a failure to verify a signature of a firmware module. In some embodiments, if the BIOS determines tampering with a firmware module being loaded, such as indicated by a failure to verify a signature of the firmware module or an address or file path that does not point to a location at which the firmware module to be loaded is stored, the BIOS may perform remediation action, such as deactivating the driver and/or loading a known secure copy of the driver. For example, if the BIOS detects a security issue with a driver that has been loaded, the BIOS may prevent the driver from executing. In some embodiments, if the BIOS determines that one or more files of the BIOS firmware modules are missing, the BIOS may perform resiliency operations to restore the missing files. The BIOS may also log discrepancies in boot sensitive path events, such as paths that do not point to a correct location of one or more firmware modules to be loaded. Thus, the BIOS may perform a number of operations based on a determination of one or more firmware modules and associated addresses and/or file paths to be loaded. In some embodiments, an address may include a file path of a firmware module to be loaded. The BIOS may proceed with booting of the information handling system. For example, if a driver of the BIOS firmware modules to be loaded is a telemetry collection driver, the BIOS may collect telemetry data from one or more components while proceeding with booting of the information handling system.

If the BIOS fails to verify a signature of the BIOS firmware module manifest file, the BIOS may, at step 1012 boot the information handling system without using the manifest. For example, the BIOS may load and execute all firmware modules using hardcoded file paths stored in the BIOS of the information handling system, rather than file paths stored in the BIOS firmware module manifest or may bypass loading and execution of the firmware modules specified by the BIOS firmware module manifest. Thus, the BIOS may refrain from use of the BIOS firmware module manifest if the BIOS fails to verify a signature of the BIOS firmware module manifest.

The flow chart diagrams of FIGS. 6-10 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for activation of firmware modules of an information handling system, comprising:

accessing, by a basic input output system (BIOS) of the information handling system, a first list indicating one or more activation statuses of one or more BIOS firmware modules;

determining, by the BIOS, a BIOS firmware module of the one or more BIOS firmware modules to load based, at least in part, on the first list indicating one or more activation statuses of the one or more BIOS firmware modules; and loading the determined BIOS firmware module of the one or more BIOS firmware modules, by the BIOS, during booting of the information handling system, wherein loading the determined BIOS firmware module comprises:

determining based, at least in part, on the first list a file path of the determined BIOS firmware module, wherein the first list comprises one or more file paths of the one or more BIOS firmware modules, wherein the determined file path comprises a file path for a location on an extended system partition of the information handling system; and loading the determined BIOS firmware module, of the one or more BIOS firmware modules, using the determined file path.

2. The method of claim 1, further comprising:

generating, by the BIOS, the first list during a power-on self-test (POST) stage of initialization of the information handling system.

3. The method of claim 2, wherein generating, by the BIOS, the first list comprises including, in the first list, one or more signatures associated with the one or more file paths of the one or more BIOS firmware modules, and wherein determining the file path of the determined BIOS firmware module comprises verifying a signature associated with the file path of the determined BIOS firmware module.

4. The method of claim 1, further comprising:

receiving an update to the BIOS of the information handling system; and applying the update to the BIOS of the information handling system, wherein applying the update comprises updating the one or more file paths of the one or more BIOS firmware modules based on the update.

5. The method of claim 1, further comprising:

executing the determined BIOS firmware module during booting of the information handling system.

6. The method of claim 5, wherein the determined BIOS firmware module is a telemetry collection BIOS firmware module, and wherein executing the determined BIOS firmware module comprises collecting telemetry data during booting of the information handling system.

7. The method of claim 1, further comprising:

receiving, at operating system runtime, user input indicating activation of the BIOS firmware module;

notifying, by the operating system, the BIOS of the receipt of the user input indicating activation of the BIOS firmware module; and adjusting, by the BIOS, an activation status of the BIOS firmware module in the list based, at least in part, on the notification.

8. An information handling system, comprising:

a processor; and a memory, wherein the processor is configured to perform steps comprising:

accessing, by a basic input output system (BIOS) of the information handling system, a first list indicating one or more activation statuses of one or more BIOS firmware modules;

determining, by the BIOS, a BIOS firmware module, of the one or more BIOS firmware modules, to load based, at least in part, on the first list indicating one or more activation statuses of the one or more BIOS firmware modules; and loading the determined BIOS firmware module of the one or more BIOS firmware modules, by the BIOS, during booting of the information handling system, wherein loading the determined BIOS firmware module comprises:

determining based, at least in part, on the first list a file path of the determined BIOS firmware module, wherein the first list comprises one or more file paths of the one or more BIOS firmware modules, wherein the determined file path comprises a file path for a location on an extended system partition of the information handling system; and loading the determined BIOS firmware module, of the one or more BIOS firmware modules, using the determined file path.

9. The information handling system of claim 8, wherein the processor is further configured to perform steps comprising:

generating, by the BIOS, the first list during a power-on self-test (POST) stage of initialization of the BIOS.

10. The information handling system of claim 9, wherein generating, by the BIOS, the first list comprises including, in the first list, one or more signatures associated with the one or more file paths of the one or more BIOS firmware modules, and wherein determining the file path of the determined BIOS firmware module comprises verifying a signature associated with the file path of the determined BIOS firmware module.

11. The information handling system of claim 8, wherein the processor is further configured to perform steps comprising:

receiving an update to the BIOS of the information handling system; and applying the update to the BIOS of the information handling system, wherein applying the update comprises updating the one or more file paths of the one or more BIOS firmware modules based on the update.

12. The information handling system of claim 8, wherein the processor is further configured to perform steps comprising:

executing the determined BIOS firmware module during booting of the information handling system.

13. The information handling system of claim 12, wherein the determined BIOS firmware module is a telemetry collection BIOS firmware module, and wherein executing the determined BIOS firmware module comprises collecting telemetry data during booting of the information handling system.

14. The information handling system of claim 8, wherein the processor is further configured to perform steps comprising:

receiving, at operating system runtime, user input indicating activation of the BIOS firmware module;

notifying, by the operating system, the BIOS of the receipt of the user input indicating activation of the BIOS firmware module; and adjusting, by the BIOS, an activation status of the BIOS firmware module in the list based, at least in part, on the notification.

15. A computer program product, comprising:

a non-transitory computer readable medium, wherein the non-transitory computer readable medium comprises instructions for causing a processor to perform steps comprising:

accessing, by a basic input output system (BIOS) of an information handling system, a first list indicating one or more activation statuses of one or more BIOS firmware modules;

determining, by the BIOS, a BIOS firmware module, of the one or more BIOS firmware modules, to load based, at least in part, on the first list indicating one or more activation statuses of the one or more BIOS firmware modules; and loading the determined BIOS firmware module of the one or more BIOS firmware modules, by the BIOS, during booting of the information handling system, wherein loading the determined BIOS firmware module comprises:

determining based, at least in part, on the first list a file path of the determined BIOS firmware module, wherein the first list comprises one or more file paths of the one or more BIOS firmware modules, wherein the determined file path comprises a file path for a location on an extended system partition of the information handling system; and loading the determined BIOS firmware module, of the one or more BIOS firmware modules, using the determined file path.

16. The computer program product of claim 15, wherein the non-transitory computer readable medium further comprises instructions for causing the processor to perform steps comprising:

generating, by the BIOS, the first list during a power-on self-test (POST) stage of initialization of the information handling system.

17. The computer program product of claim 16, wherein generating, by the BIOS, the first list comprises including, in the first list, one or more signatures associated with the one or more file paths of the one or more BIOS firmware modules, and wherein determining the file path of the determined BIOS firmware module comprises verifying a signature associated with the file path of the determined BIOS firmware module.

18. The computer program product of claim 15, wherein the non-transitory computer readable medium further comprises instructions for causing the processor to perform steps comprising:

receiving an update to the BIOS of the information handling system; and applying the update to the BIOS of the information handling system, wherein applying the update comprises updating the one or more file paths of the one or more BIOS firmware modules based on the update.

19. The computer program product of claim 15, wherein the non-transitory computer readable medium further comprises instructions for causing the processor to perform steps comprising:

executing the determined BIOS firmware module during booting of the information handling system.

20. The computer program product of claim 19, wherein the determined BIOS firmware module is a telemetry collection BIOS firmware module, and wherein executing the determined BIOS firmware module comprises collecting telemetry data during booting of the information handling system.

\* \* \* \* \*